US012768799B2

(12) United States Patent
Nakayama

(10) Patent No.: US 12,768,799 B2
(45) Date of Patent: Oct. 20, 2026

(54) TESTING APPARATUS AND TESTING METHOD

(71) Applicant: Tokyo Electron Limited, Tokyo (JP)

(72) Inventor: Hiroyuki Nakayama, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 142 days.

(21) Appl. No.: 18/950,883

(22) Filed: Nov. 18, 2024

(65) Prior Publication Data

US 2025/0076215 A1 Mar. 6, 2025

Related U.S. Application Data

(63) Continuation of application No. PCT/JP2023/018575, filed on May 18, 2023.

(30) Foreign Application Priority Data

Jun. 1, 2022 (JP) ................................ 2022-089894

(51) Int. Cl.
*G01N 21/95* (2006.01)
*G01M 11/02* (2006.01)
(Continued)

(52) U.S. Cl.
CPC ..... *G01N 21/9501* (2013.01); *G01M 11/0214* (2013.01); *G01N 21/8806* (2013.01); *G01N 2021/8835* (2013.01)

(58) Field of Classification Search
CPC ........ G01N 21/64; G01N 21/88; G01N 21/95; G01M 11/02; G01R 31/26; G01R 31/28
See application file for complete search history.

(56) References Cited

U.S. PATENT DOCUMENTS 11,543,445 B2 1/2023 Kasai et al.
11,927,539 B2 3/2024 Akiyama et al.
(Continued)

FOREIGN PATENT DOCUMENTS

JP H09-250908 A 9/1997
JP H11-053923 A 2/1999
(Continued)

OTHER PUBLICATIONS

PCT International Search Report, PCT Application No. PCT/JP2023/018575, Jul. 25, 2023, five pages.

*Primary Examiner* — Neel D Shah
(74) *Attorney, Agent, or Firm* — Fenwick & West LLP

(57) ABSTRACT

An inspection apparatus for inspecting an inspection target device formed on an inspection target object. The inspection apparatus comprises a placing table configured to support the inspection target object. The placing table includes a transparent placing surface and an irradiation part disposed below the placing surface. The irradiation part includes a light guiding plate having a facing surface facing the inspection target object, and a light source part disposed in a region laterally outside from the light guiding plate and configured to emit light toward a lateral edge surface of the light guiding plate. The light guiding plate emits light from the facing surface toward the placing surface. The placing table further includes an optical member that transmits light directed from the facing surface toward the inspection target object. The optical member is divided into a plurality of regions, with light transmittance configured to be variable for each region.

10 Claims, 7 Drawing Sheets

(51) Int. Cl.

| | |
|---|---|
| ***G01N 21/88*** | (2006.01) |
| ***G01R 31/26*** | (2020.01) |
| ***G01R 31/28*** | (2006.01) |

(56) References Cited

U.S. PATENT DOCUMENTS

| | | | |
|---|---|---|---|
| 11,940,485 | B2 | 3/2024 | Akiyama et al. |
| 2020/0386805 | A1 | 12/2020 | Kasai et al. |
| 2021/0356405 | A1 | 11/2021 | Akiyama et al. |
| 2021/0389366 | A1 | 12/2021 | Akiyama et al. |
| 2024/0168080 | A1* | 5/2024 | Nakamura ......... G01N 21/6489 |

FOREIGN PATENT DOCUMENTS

| | | | |
|---|---|---|---|
| JP | 2019-106491 | A | 6/2019 |
| JP | 2020-068333 | A | 4/2020 |
| JP | 2020-077716 | A | 5/2020 |
| KR | 10-2009-0118309 | A | 11/2009 |

* cited by examiner

10

10A

TESTING APPARATUS AND TESTING METHOD

CROSS-REFERENCE TO RELATED APPLICATIONS

This application is a bypass continuation application of International Application No. PCT/JP2023/018575 having an international filing date of May 18, 2023 and designating the United States, the International Application being based upon and claiming the benefit of priority from the Japanese Patent Application No. 2022-089894 filed on Jun. 1, 2022, the entire contents of which are incorporated herein by reference.

TECHNICAL FIELD

The present disclosure relates to an inspection apparatus and an inspection method.

BACKGROUND

An inspection apparatus of Japanese Laid-open Patent Publication No. 2019-106491 inspects an imaging device formed on an inspection target object by allowing light to be incident on the imaging device and bringing a contact terminal into electrical contact with a wiring layer of the imaging device. In Japanese Laid-open Patent Publication No. 2019-106491, light is incident on the imaging device from the back surface, which is the surface opposite to the surface on which the wiring layer is provided. The inspection apparatus of Japanese Laid-open Patent Publication No. 2019-106491 includes a placing table made of a light-transmitting member on which the inspection target object is placed to face the back surface of the imaging device, and a light irradiation mechanism having a plurality of LEDs that are arranged to face the inspection target object with the placing table interposed therebetween and are directed toward the inspection target object.

SUMMARY

The technique of the present disclosure enables the inspection target object to be irradiated with planar light having in-plane uniformity when a side-incidence irradiation part is used for inspecting a backside-illumination imaging device.

According to one embodiment of the present disclosure, an inspection apparatus for inspecting an inspection target device, wherein the inspection target device is a backside-illumination imaging device, on which light is incident from a back surface opposite to a side where a wiring layer is provided, and is formed on an inspection target object, the inspection apparatus comprises a placing table configured to support the inspection target object while facing the back surface of the imaging device, wherein the placing table includes a transparent placing surface on which the inspection target object is placed, and an irradiation part disposed below the placing surface and configured to irradiate light toward the inspection target object placed on the placing surface, wherein the irradiation part includes a light guiding plate having a facing surface facing the inspection target object with the placing surface interposed therebetween, and a light source part disposed in a region laterally outside from the light guiding plate and configured to emit light toward a lateral edge surface of the light guiding plate, wherein the light guiding plate emits light, which is emitted from the light source part and incident on the lateral edge surface of the light guiding plate, from the facing surface toward the placing surface, the placing table further includes an optical member that transmits light directed from the facing surface of the light guiding plate toward the inspection target object placed on the placing surface, and the optical member is divided into a plurality of regions, with light transmittance configured to be variable for each region.

DETAILED DESCRIPTION

Figure 1:
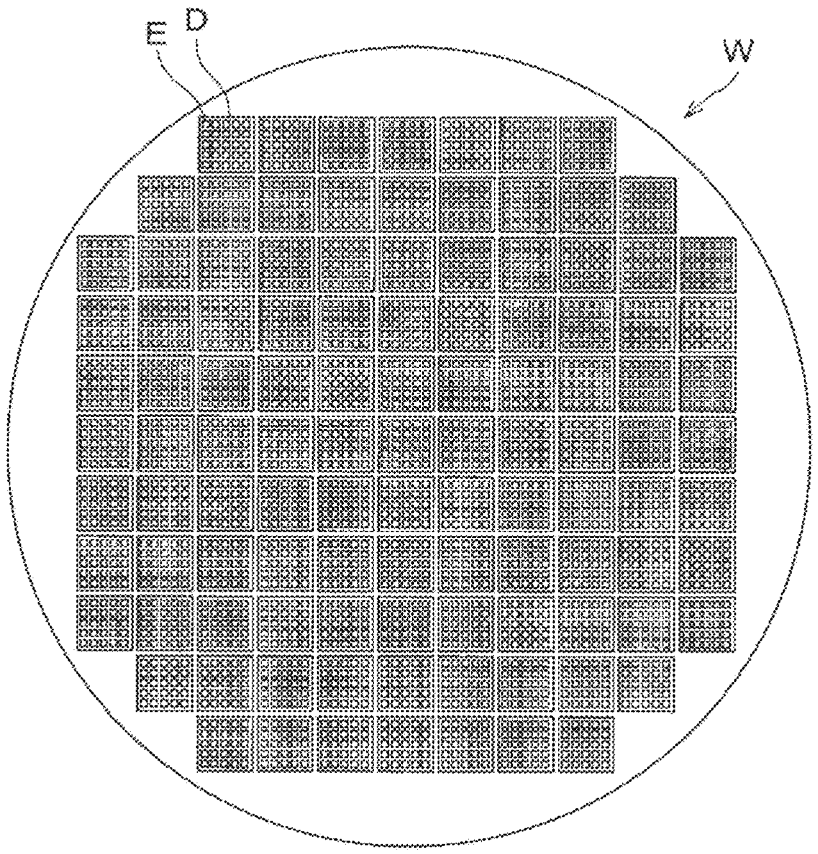
FIG. 1 is a plan view schematically showing a configuration of a substrate as an inspection target object on which a backside-illumination imaging device is formed.

In a semiconductor manufacturing process, a plurality of semiconductor devices having a predetermined circuit pattern are formed on a substrate such as a semiconductor wafer (hereinafter, referred to as "wafer"). The electrical characteristics of the formed semiconductor devices are inspected to classify them into non-defective products and defective products. The semiconductor devices are inspected using an inspection apparatus referred to as a prober or the like before the substrate is divided into semiconductor devices.

In the inspection apparatus, a probe card having a plurality of probes, which are needle-shaped contact terminals, is disposed above a placing table that supports the substrate. During the inspection, the probe card and the wafer on the placing table become close to each other, and the probes of the probe card are brought into contact with electrodes of the semiconductor devices formed on the substrate. In that state, an electrical signal is supplied from a test head disposed above the probe card to the semiconductor devices through the probes. Then, based on the electrical signal received by the test head from the semiconductor devices through the probes, the corresponding semiconductor devices are classified into defective products or non-defective products.

When the semiconductor device to be inspected is an imaging device such as a CMOS sensor or the like, the inspection is performed while irradiating the imaging device with light, unlike other general semiconductor devices.

Further, recently, a backside-illumination imaging device that receives light incident from the back side opposite to the front side on which a wiring layer is formed has been developed as the imaging device.

In an inspection apparatus for a backside-illumination imaging device, a placing table supports a substrate while facing the back side of the imaging device. Further, in the inspection apparatus for the backside-illumination imaging device, the placing table has a transparent placing surface on which the substrate is placed, and an irradiation part that is disposed below the placing surface and irradiates light toward the substrate placed on the placing surface.

The irradiation part has, e.g., a light guiding plate having a facing surface that faces the substrate with the placing surface interposed therebetween, and a light source part that is disposed in a region laterally outside from the light guiding plate and emits light toward a lateral edge surface of the light guiding plate. Further, in the irradiation part, the light guiding plate reflects the light emitted from the light source part and incident from the lateral edge surface of the light guiding plate toward the facing surface by reflective dots or the like, and emits planar light from the facing surface. The planar light is irradiated onto the substrate placed on the placing surface. Hereinafter, the irradiation part on which the light is incident from the lateral edge surface of the light guiding plate as described above is referred to as "side-incidence irradiation part."

In the case of irradiating a substrate with planar light during inspection, it is preferable that the planar light has in-plane uniformity. In the case of using a side-incidence irradiation part, a method of adjusting an intensity of light incident on the lateral edge surface of the light guiding plate, or a method of adjusting dimensions or arrangement of the above-described reflective dots of the light guiding plate is considered as method of making the planar light have in-plane uniformity. However, it is difficult to derive conditions in which the planar light has in-plane uniformity by the above methods. In other words, it is difficult to make the planar light have in-plane uniformity by the above methods.

The technique of the present disclosure enables the inspection target object to be irradiated with planar light having in-plane uniformity when a side-incidence illumination part is used for inspection a backside-illumination imaging device.

Hereinafter, an inspection apparatus and an inspection method according to the embodiment will be described with reference to the accompanying drawings. In this specification and the drawings, like reference numerals will be used for like parts having substantially the same functional configuration, and redundant description thereof will be omitted.

In the technique of the present embodiment, an inspection target device is a backside-illumination imaging device, so that the backside-illumination imaging device will be described first.

Backside-Illumination Imaging Device

Figure 2:
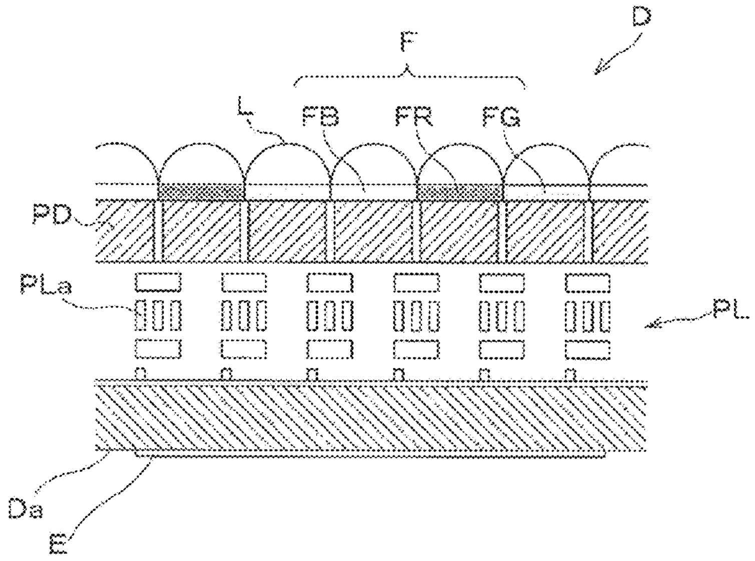
FIG. 2 is a cross-sectional view schematically showing a configuration of a backside-illumination imaging device.

FIG. 1 is a plan view schematically showing a configuration of a substrate as an inspection target object on which a backside-illumination imaging device is formed, and FIG. 2 is a cross-sectional view schematically showing the configuration of the backside-illumination imaging device.

As shown in FIG. 1, a plurality of backside-illumination imaging devices D are formed on a substantially disc-shaped wafer W that is an example of a substrate.

The backside-illumination imaging device D is a solid-state imaging element, and has a photoelectric conversion part PD, which is a photodiode, and a wiring layer PL including a plurality of wirings PLa, as shown in FIG. 2, for example. Light is incident on the backside-illumination imaging device D from the backside of the wafer W, which is the surface opposite to the front surface on which the wiring layer PL is provided. The backside-illumination imaging device D receives the light incident on the backside of the wafer W at the photoelectric conversion part PD via an on-chip lens L and a color filter F. The color filter F includes a red color filter FR, a blue color filter FB, and a green color filter FG.

Further, an electrode E is formed on the front (outer) surface Da of the backside-illumination imaging device D, i.e., the front (outer) surface of the wafer W, and the electrode E is electrically connected to the wiring PLa of the wiring layer PL. The wiring PLa is used for inputting an electric signal to a circuit element in the backside-illumination imaging device D or outputting an electric signal from the circuit element to the outside of the backside-illumination imaging device D. The wiring layer PL may include a pixel transistor for controlling a signal related to the photoelectric conversion part.

Inspection Apparatus

Next, the inspection apparatus according to the present embodiment will be described.

Figure 3:
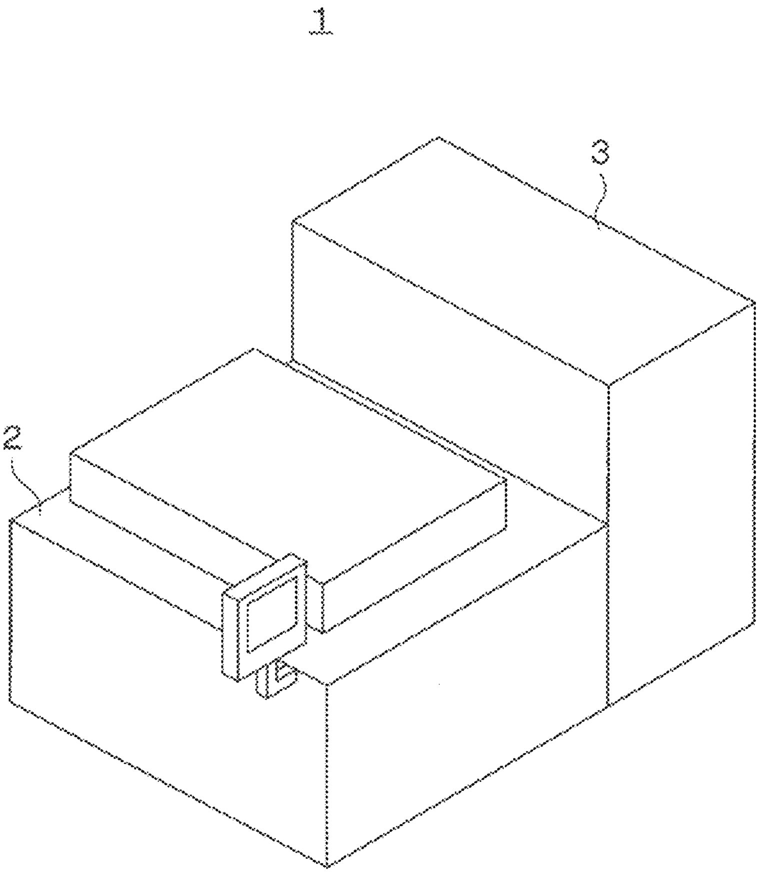
FIG. 3 is a perspective view schematically showing a configuration of a prober as an inspection apparatus according to an embodiment.
Figure 4:
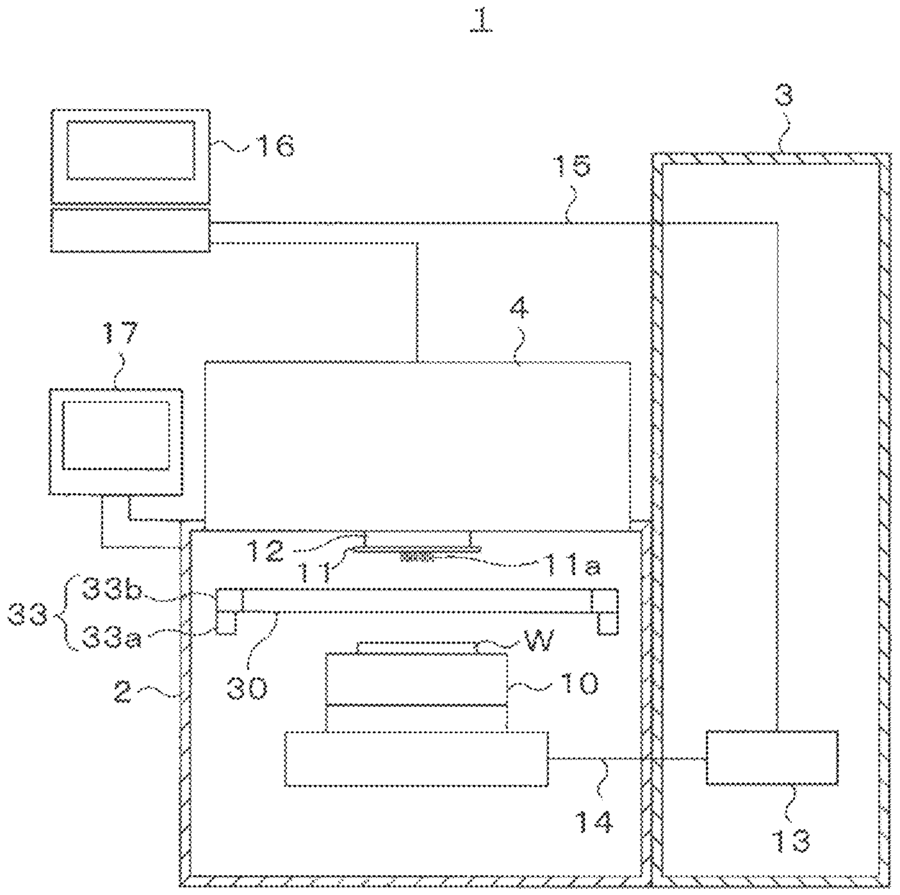
FIG. 4 is a front view schematically showing the configuration of the prober as the inspection apparatus according to the embodiment.

FIGS. 3 and 4 are a perspective view and a front view, respectively, schematically showing a configuration of a prober 1 as an inspection apparatus according to the present embodiment. In FIG. 4, a part of the prober 1 in FIG. 3 is illustrated in cross section to show components in a loader and an accommodation chamber of the prober 1 which will be described later.

The prober 1 inspects electrical characteristics of each of a plurality of backside-illumination imaging devices D (hereinafter, may be abbreviated as "imaging devices D") formed on the wafer W. As shown in FIGS. 3 and 4, the prober 1 includes an accommodation chamber 2, a loader 3 disposed adjacent to the accommodation chamber 2, and a tester 4 disposed to cover the accommodation chamber 2.

The accommodation chamber 2 is a hollow housing, and has a stage 10 serving as a placing table. As will be described later, the stage 10 supports the wafer W such that the back surfaces of the imaging devices D face the stage 10.

Further, the stage 10 is configured to be movable in a horizontal direction and a vertical direction, and the relative positions of a probe card 11 to be described later and the wafer W may be adjusted to bring the electrodes E on the surface of the wafer W into contact with the probes 11*a* of the probe card 11 to be described later.

Further, the probe card 11 is disposed above the stage 10 in the accommodation chamber 2 to face the stage 10. The probe card 11 has a plurality of needle-shaped probes 11*a* serving as contact terminals. The probes 11*a* are formed to be in contact with the corresponding electrodes E on the surface of the wafer W.

The probe card 11 is connected to the tester 4 via an interface 12. In the case of inspecting the imaging devices D, the probes 11*a* are brought into contact with the corresponding electrodes E, and a power inputted from the tester 4 via the interface 12 is supplied to the imaging devices D, or a signal from the imaging devices D is transmitted to the tester 4 via the interface 12.

A sensor bridge 30 and an advancing/retracting mechanism 33 disposed in the accommodation chamber 2 will be described later.

The loader 3 takes out the wafer W accommodated in a front opening unified pod (FOUP) (not shown), which is a transfer container, and transfers it to the stage 10 of the accommodation chamber 2. Further, the loader 3 receives the wafer W from the stage 10 after the inspection of the electrical characteristics of the imaging devices D is completed, and stores it in the FOUP.

The loader 3 has a controller 13 that performs various controls. The controller 13 is a computer having a processor such as a central processing unit (CPU) and a memory, and has a program storage part. The program storage part stores a program that control the operation of individual components of the prober 1 during inspection of electrical characteristics or during illuminance distribution acquisition processing to be described later. The program also performs calculation required for the inspection of the electrical characteristics or the illuminance distribution acquisition processing. Further, the program may be recorded in a computer-readable storage medium and installed in the controller 13 from the storage medium. The storage medium may store the program temporarily or non-temporarily.

The controller 13 is connected to the stage 10 via a wiring 14, and is connected to a tester computer 16 via a wiring 15. The controller 13 controls an operation of a light source part 52 (to be described later) of the stage 10 based on an input signal from the tester computer 16. Further, the controller 13 may be disposed in the accommodation chamber 2.

The tester 4 has a test board (not shown) that reproduces a part of a circuit configuration of a main board on which the imaging devices D are placed. The test board is connected to the tester computer 16. The tester computer 16 determines whether the imaging devices D are defective or non-defective based on the signal from the imaging devices D. In the tester 4, the circuit configuration of multiple types of main boards can be reproduced by replacing the test board.

Further, the prober 1 includes a user interface part 17. The user interface part 17 is used for displaying information to a user or for allowing a user to input instructions. The user interface part 17 includes a display panel having a touch panel or a keyboard, for example.

In the prober 1 having the above-described individual components, in the case of inspecting electrical characteristics of the imaging devices D, the tester computer 16 transmits data to a test board connected to the imaging devices D via the probes 11*a*. Further, the tester computer 16 determines whether or not the transmitted data has been correctly processed by the test board based on the electrical signal from the test board.

Internal Structure of Accommodation Chamber 2

Figure 5:
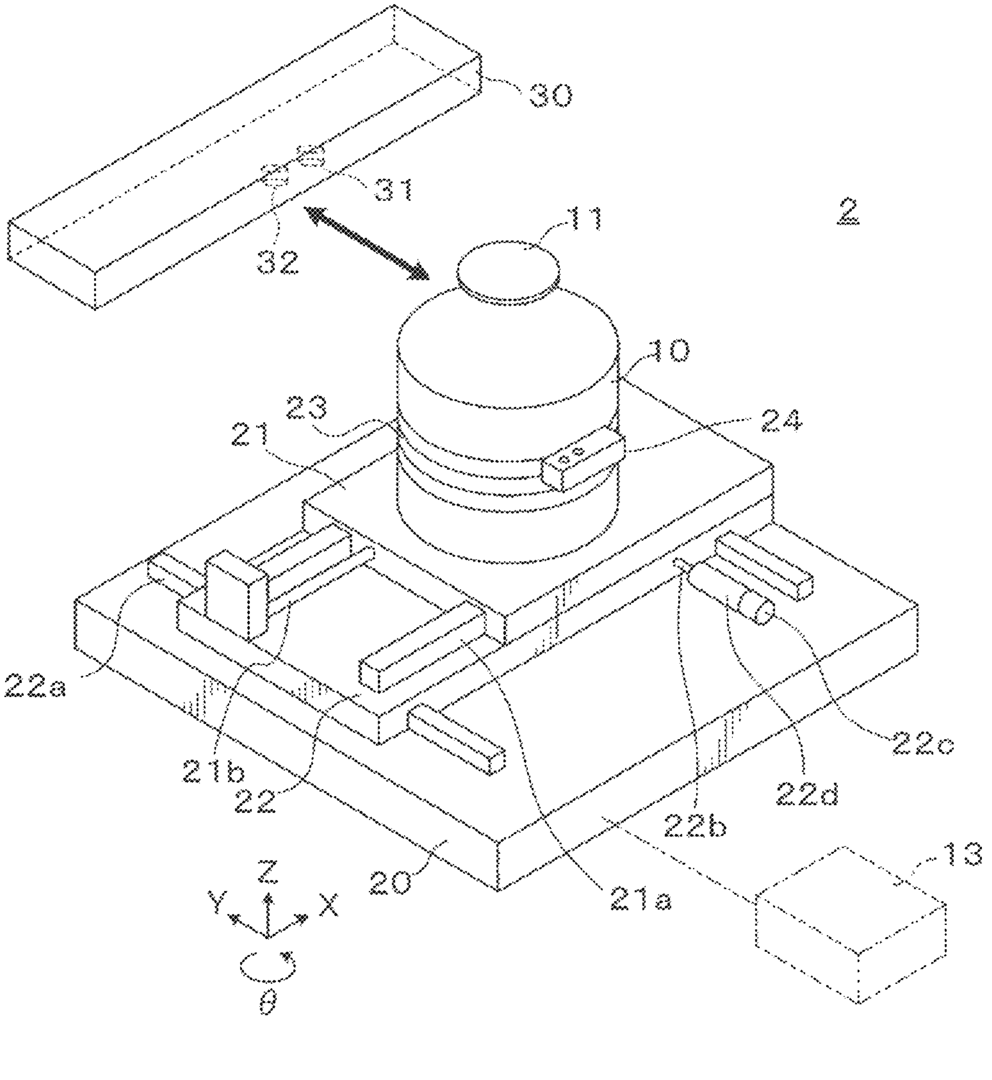
FIG. 5 is a perspective view schematically showing an internal structure of an accommodation chamber.

Next, the internal structure of the accommodation chamber 2 will be further described with reference to FIG. 5. FIG. 5 is a perspective view schematically showing an outline of the internal structure of the accommodation chamber 2.

As illustrated in FIG. 5, in the accommodation chamber 2, the stage 10 is placed on a base 20, and has an X-direction moving unit 21 that moves along the X direction in FIG. 5, a Y-direction moving unit 22 that moves along the Y direction in FIG. 5, and a Z-direction moving unit 23 that moves along the Z direction in FIG. 5. The X-direction moving unit 21, the Y-direction moving unit 22, and the Z-direction moving unit 23 constitute a moving mechanism that relatively moves the stage 10 and an illuminance sensor 32 to be described later.

The X-direction moving unit 21 moves the stage 10 in the X direction by rotating a ball screw 21*b* along a guide rail 21*a* extending in the X direction. The ball screw 21*b* is rotated by a motor (not shown). Further, the amount of movement of the stage 10 can be detected by an encoder (not shown) assembled to the motor.

The Y-direction moving unit 22 moves the stage 10 in the Y-direction by rotating a ball screw 22*b* along a guide rail 22*a* extending in the Y-direction. The ball screw 22*b* is rotated by a motor 22*c*. The amount of movement of the stage 10 can be detected by an encoder 22*d* assembled to the motor 22*c*.

With the above configuration, the X-direction moving unit 21 and the Y-direction moving unit 22 move the stage 10 in the X-direction and Y-direction, which are perpendicular to each other, along a horizontal plane.

The Z-direction moving unit 23 has a motor and an encoder (both not shown), and vertically moves the stage 10 along the Z-direction and detects the amount of movement thereof. The Z-direction moving unit 23 moves the stage 10 toward the probe card 11, and brings the electrodes of the imaging devices D formed on the wafer W into contact with the probes. Further, the stage 10 is disposed on the Z-direction moving unit 23 to be rotatable in the e direction in FIG. 5 by a motor (not shown).

Further, a lower imaging unit 24 is disposed in the accommodation chamber 2.

The lower imaging unit 24 images the probes 11*a* formed on the probe card 11. The lower imaging unit 24 has a lower camera (not shown) formed as, e.g., a complementary metal oxide semiconductor (CMOS) camera, and an optical system (not shown) that guides light from an imaging target to the lower camera. The lower imaging unit 24 uses the lower camera to image the probes 11*a* formed on the probe card 11, and the imaging result is outputted to the controller 13 and used for aligning the electrodes on the wafer W with the probes 11*a*, for example.

The lower imaging unit 24 is fixed to the stage 10 and moves in the X, Y, and Z directions together with the stage 10.

Further, in the accommodation chamber 2, a sensor bridge 30 serving as a placing part is disposed between the stage 10 and the probe card 11 in the vertical direction. The sensor bridge 30 is provided with an upper camera 31 serving as an imaging part and the illuminance sensor 32 serving as an illuminance measuring part.

The upper camera 31 images the wafer W or the like, and is formed as, e.g., a CMOS camera or the like. An optical system may be provided for the upper camera 31, similarly to the lower camera.

The illuminance sensor 32 is used for acquiring the in-plane distribution of the illuminance of light from a placing surface 40*a* (see reference numeral 40*a* in FIG. 6 to be described later) of the wafer W on the stage 10. The illuminance sensor 32 measures the illuminance of light from a part of the placing surface. Further, in the following description, the region (hereinafter, referred to as "unit sensor region") on the placing surface where the illuminance sensor 32 measures the illuminance by one measurement process corresponds to one imaging device D.

The imaging result of the upper camera 31 or the measurement result of the illuminance sensor 32 is outputted to the controller 13.

The sensor bridge 30 is provided with the advancing/retracting mechanism 33 (see FIG. 4). The advancing/retracting mechanism 33 has a guide rail 33*a* that guides the advancing/retracting operation of the sensor bridge 30, and a driving part 33*b* formed by combining a ball screw and a motor that drives the sensor bridge 30 to move along the guide rail 33*a*. The advancing/retracting mechanism 33 advances and retracts the sensor bridge 30, i.e., the illuminance sensor 32, with respect to the region facing the placing surface of the stage 10. Specifically, the advancing/retracting mechanism 33 moves the illuminance sensor 32 between a predetermined region facing the placing surface and a region on the outer side of the placing surface of the stage 10 in plan view.

Stage 10

Figure 6:
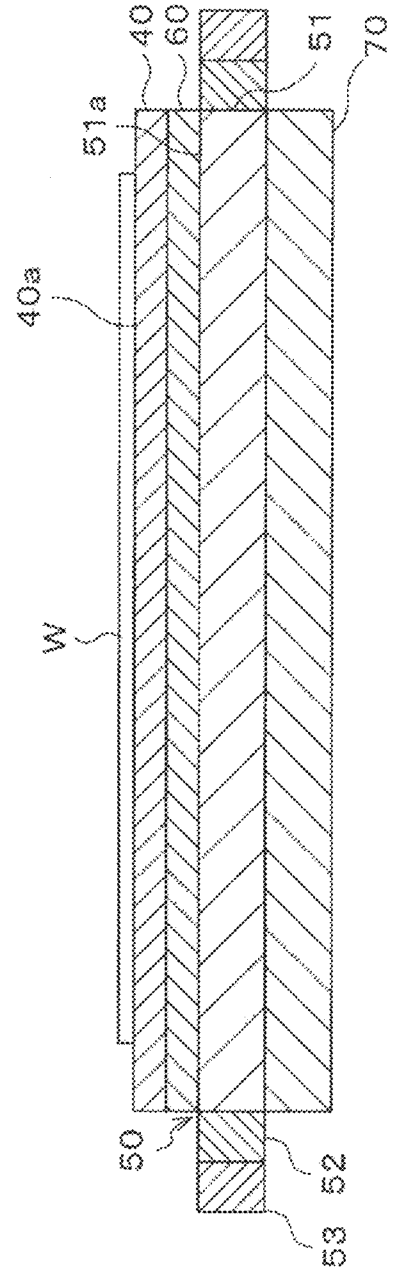
FIG. 6 is a cross-sectional view schematically showing a configuration of a stage.
Figure 7:
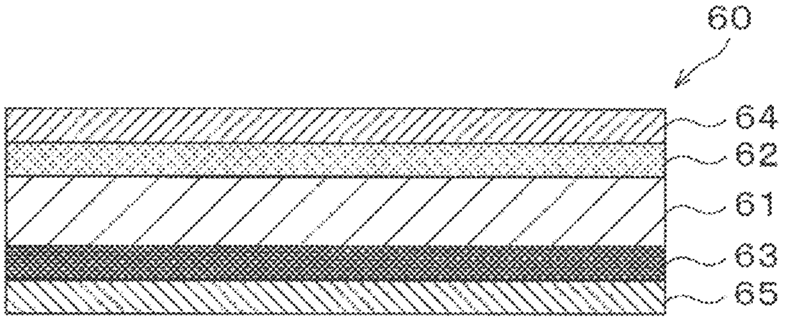
FIG. 7 is a partially enlarged cross-sectional view of a liquid crystal panel.

Next, the configuration of the stage 10 will be described. FIG. 6 is a cross-sectional view schematically showing a configuration of the stage 10. FIG. 7 is a partially enlarged cross-sectional view of a liquid crystal panel to be described later.

The stage 10 supports the wafer W such that the back surfaces of the imaging devices D face the stage 10, and has a ceiling plate 40, an irradiation part 50, a liquid crystal panel 60, and a base 70, as shown in FIG. 6, for example.

The ceiling plate 40 is a flat member made of a light-transmitting material, and the upper surface 40*a* thereof serves as the placing surface on which the wafer W is placed. The ceiling plate 40 transmits and diffuses, e.g., the light emitted from the irradiation part 50 toward the wafer W and transmitted through the liquid crystal panel 60. In other words, the ceiling plate 40 is formed to function as a diffusion plate, for example. Further, the ceiling plate 40 is formed in a square shape with a side length greater than the diameter of the wafer W in plan view, for example.

Further, the above-described "light-transmitting material" is a material that transmits light (i.e., light from the irradiation part 50) of a wavelength in an inspection range, and is, e.g., glass.

The irradiation part 50 is placed below the placing surface on the stage 10, and irradiates light toward the wafer W placed on the placing surface. In this example, the irradiation part 50 is disposed below the ceiling plate 40, whose upper surface 40*a* serves as the placing surface, and irradiates light toward the wafer W placed on the upper surface 40*a*. In the following description, the upper surface 40*a* of the ceiling plate 40 may be referred to as "placing surface 40*a*."

The irradiation part 50 has, e.g., a light guiding plate 51 and a light source part 52.

The light guiding plate 51 is a disc-shaped member, for example, having a facing surface 51*a* facing the wafer W with the placing surface 40*a* interposed therebetween. The shape and dimensions of the light guiding plate 51 in plan view are the same as those of the ceiling plate 40, for example. The light guiding plate 51 reflects and diffuses the light emitted from the light source part 52 and incident on the lateral edge surface of the light guiding plate 51, and emits it as planar light from the facing surface 51*a*. Further, the light guiding plate 51 is disposed such that the imaging device forming region of the wafer W is included in the region where the planar light is emitted in plan view.

The light source part 52 is disposed in a region laterally outside from the light guiding plate 51, and emits light toward the lateral edge surface of the light guiding plate 51. The light source part 52 has, e.g., a plurality of LEDs (not shown) arranged along each side of the light guiding plate 51.

Further, in the present embodiment, a heat dissipation plate 53 is disposed on a back surface of a substrate (not shown) that supports the LEDs in order to dissipate heat from the LEDs of the light source part 52 to the outside of the stage 10. The heat dissipation plate 53 is made of, e.g., a metal material. The heat dissipation plate 53 may have a passage through which a coolant such as water or the like flows to cool the LEDs of the light source part 52.

The liquid crystal panel 60 is an example of an optical member that transmits light from the facing surface 51*a* of the light guiding plate 51 toward the wafer W placed on the placing surface 40*a*. The liquid crystal panel 60 is divided into a plurality of regions (hereinafter, referred to as "element regions"), and the light transmittance is variable for each region. Specifically, the liquid crystal panel 60 has a liquid crystal layer 61 and glass substrates 62 and 63 that sandwich and seal the liquid crystal layer 61, as shown in FIG. 7, for example. Polarizing plates 64 and 65 are provided on the opposite side of the liquid crystal layer 61 of each of the glass substrates 62 and 63. Further, in the liquid crystal panel 60, transparent electrodes (not shown) are formed on the glass substrates 62 and 63 for each of the above-described element regions. The light transmittance of each element region can be adjusted by changing the voltage applied to the gap between the transparent electrodes for each element region. A circuit (not shown) including a power supply that applies a voltage to the transparent electrodes is controlled by the controller 13. In other words, the light transmittance of the liquid crystal panel 60 is controlled by the controller 13.

In the prober 1, the light emitted from the LED of the light source part 52 of the irradiation part 50 and incident on the lateral edge surface of the light guiding plate 51 is reflected and diffused in the light guiding plate 51, and is emitted as planar light from the facing surface 51*a* facing the wafer W. Then, the planar light transmits through, e.g., the liquid crystal panel 60 and the ceiling plate 40 and is incident on the imaging devices D of the wafer W.

Further, the LEDs of the light source part 52 emit light including light having a wavelength in the inspection range. The light having a wavelength in the inspection range is, e.g., light having a wavelength in a visible light range, and may be light outside the visible light range, such as infrared light or the like, depending on types of the imaging devices D.

The base 70 is disposed at a position facing the wafer W on the placing surface 40*a*, i.e., below the light guiding plate 51, with the ceiling plate 40, the liquid crystal panel 60, and the light guiding plate 51 interposed therebetween, and supports the ceiling plate 40, the liquid crystal panel 60, and the irradiation part 50. For example, the ceiling plate 40 is held by the liquid crystal panel 60 by adhesion using a transparent adhesive material. The liquid crystal panel 60 is held by the irradiation part 50 by adhesion using a transparent adhesive material. The irradiation part 50 is held by the base 70 by adhesion using an adhesive material.

The base 70 may be provided with a temperature controller (not shown) that adjusts the temperature of the imaging devices D of the wafer W placed on the placing surface 40*a*. The temperature controller may be provided with at least one of a heater (e.g., a resistance heater) that heats the wafer W and a device (e.g., a channel for a coolant) that cools the wafer W.

Illuminance Distribution Acquisition and Transmittance Determination Process

Next, an illuminance distribution acquisition and transmittance determination process performed by the prober 1 will be described. The illuminance distribution acquisition and transmittance determination process is a process for acquiring the in-plane distribution of the illuminance of light irradiated through the placing surface 40*a* of the stage 10 and determining the transmittance of the liquid crystal panel

60, and is performed at the time of starting up the prober 1, during maintenance, during quality control (QC), or the like, for example.

In the illuminance distribution acquisition and transmittance determination process, first, the stage 10 is moved to a predetermined position and a predetermined height in the horizontal plane by the X-direction moving unit 21, the Y-direction moving unit 22, and the Z-direction moving unit 23. Further, the predetermined position is, e.g., a position corresponding to one of the plurality of imaging devices formed on the wafer W, that is, a position corresponding to one unit sensor region on the placing surface 40*a*.

At the same time with the above-described movement of the stage 10, or before or after the movement thereof, the sensor bridge 30 is moved by the advancing/retracting mechanism 33 such that the sensor bridge 30 is located in the region above the stage 10 after the movement.

Next, in a state where (each element region of) the liquid crystal panel 60 is adjusted to a predetermined light transmittance (e.g., 50%), the irradiation part 50 of the stage 10 is controlled to emit planar light from the above-described facing surface 51*a* of the light guiding plate 51. Further, in this case, the irradiation part 50 of the stage 10 is controlled to operate under the same conditions as those for inspection, i.e., under conditions in which light close to a desired illuminance can be irradiated to the wafer W in a state where each element region of the liquid crystal panel 60 is adjusted to the above predetermined light transmittance. Accordingly, light is irradiated in an upward direction from the placing surface 40*a* of the stage 10. Then, the illuminance sensor 32 measures the illuminance of the light irradiated from a certain unit sensor region of the placing surface 40*a*. Thereafter, the movement of the stage 10 by the X-direction moving unit 21 and the Y-direction moving unit 22, and the measurement of the illuminance by the illuminance sensor 32 are repeated. As a result, the illuminance of the light from each unit sensor region is measured for at least the entire portion of the placing surface 40*a* that corresponds to the imaging device forming region of the wafer W. Based on the measurement result, the controller 13 obtains the in-plane distribution of the illuminance of the light irradiated via the placing surface 40*a*.

Then, the controller 13 determines the light transmittance of each element region of the liquid crystal panel 60. Specifically, the controller 13 determines the light transmittance of each element region of the liquid crystal panel 60 such that the in-plane non-uniformity of the in-plane distribution of the illuminance of the acquired light is eliminated or alleviated, i.e., such that the in-plane distribution of the illuminance of the light irradiated through the placing surface 40*a* has in-plane uniformity.

After the light transmittance of each element region of the liquid crystal panel 60 is changed to the determined value, the illuminance sensor 32 may again perform measurement to obtain the in-plane distribution of the illuminance of the light irradiated through the placing surface 40*a*. Then, if the obtained result is not a desired result, the determined light transmittance of each element region of the liquid crystal panel 60 may be adjusted based on the obtained result. The acquisition of the in-plane distribution of the illuminance of the light irradiated through the placing surface 40*a* and the adjustment of the light transmittance of the liquid crystal panel 60 may be repeated until the desired in-plane distribution is obtained.

Example 1 of Inspection Process

Next, an example of an inspection process for a wafer W using the prober 1 will be described. In the following description, one imaging device D is inspected in one inspection process. However, a plurality of imaging devices D may be collectively inspected in one inspection process using the prober 1. Further, the following inspection process is performed under the control of the controller 13.

For example, first, the wafer W is taken out of the FOUP of the loader 3 and transferred into the accommodation chamber 2. Then, the wafer W is placed on the placing surface 40*a* of the stage 10 such that the back surfaces of the imaging devices D formed on the wafer W face the stage 10 and the back surface of the wafer W is brought into contact with the stage 10.

Next, the stage 10 is moved by the moving mechanism including the X-direction moving unit 21 and the like, and the probes 11*a* disposed above the stage 10 are brought into contact with the electrodes E of the imaging devices D to be inspected.

Then, the irradiation part 50 emits light under a predetermined condition. Accordingly, for example, all the LEDs of the light source part 52 are turned on, and light is incident on the lateral edge surface of the light guiding plate 51 from each LED. The incident light is reflected and diffused in the light guiding plate 51 toward the placing surface 40*a*, and is emitted in a planar shape from the facing surface 51*a* of the light guiding plate 51 that faces the wafer W.

The light emitted in a planar shape from the facing surface 51*a* passes through the liquid crystal panel 60, which has been adjusted to the light transmittance determined by the illuminance distribution acquisition and transmittance determination process. Then, the light transmits through the ceiling plate 40 while being diffused by the ceiling plate 40, and is incident on the wafer W, i.e., on the imaging device D to be inspected.

When the light is irradiated, an inspection signal is inputted to the probes 11*a*. Accordingly, the imaging devices D are inspected.

During the inspection, the temperature of the wafer W is measured by a temperature measuring mechanism (not shown). Based on the result, a temperature controller (not shown) disposed at the base 70 is controlled to adjust the temperature of the wafer W to a desired value, thereby adjusting the temperatures of the imaging devices D to a desired value.

Thereafter, the same processes described above are repeated until the inspection of all imaging devices D is completed.

Main Effects of Present Embodiment

As described above, in the present embodiment, the prober 1 includes the stage 10 that supports the wafer W while facing the back surface of the backside-illumination imaging device D, and the stage 10 has the transparent placing surface 40*a* on which the wafer W is placed, and the irradiation part 50 that is disposed below the placing surface 40*a* and irradiates light toward the wafer W placed on the placing surface 40*a*. Further, the irradiation part 50 includes the light guiding plate 51 having the facing surface 51*a* facing the wafer W with the placing surface 40*a* interposed therebetween, and the light source part 52 that is disposed in a region laterally outside from the light guiding plate 51 and emits light toward the lateral edge surface of the light guiding plate 51. The light guiding plate 51 emits light emitted from the light source part 52 and incident from the lateral edge surface of the light guiding plate 51 in a planar shape from the facing surface 51*a* toward the placing surface 40*a*. The stage 10 further has the liquid crystal panel 60 that transmits light directed from the facing surface 51*a* of the light guiding plate 51 toward the wafer W placed on the placing surface 40*a*. The liquid crystal panel 60 is divided into a plurality of element regions, and the light transmittance is variable for each element region. Therefore, in the present embodiment, the in-plane distribution of the illuminance of the light from the placing surface 40*a* is acquired, and the light transmittance in the liquid crystal panel 60 is adjusted for each element region based on the acquired result. Accordingly, the in-plane uniformity of the in-plane distribution of the illuminance of the light from the placing surface 40*a* can be obtained. Specifically, the in-plane distribution of the illuminance of the light from the placing surface 40*a* can have in-plane uniformity with a desired illuminance. In other words, in accordance with the present embodiment, when the side-incidence irradiation part 50 is used for inspecting the backside-illumination imaging device D, the wafer W can be irradiated with planar light having in-plane uniformity. Specifically, the wafer W can be irradiated with planar light having in-plane uniformity with a desired intensity. In the case of inspecting the imaging devices D formed on the wafer W, if the wafer W is irradiated with planar light having in-plane uniformity with a desired intensity, the deviation of the light irradiation intensity for each imaging device D from the desired intensity can be suppressed. As a result, the inspection of each imaging device D can be performed accurately.

Further, in the present embodiment, the side-incident irradiation part 50 is used, and the light source part 52 of the irradiation part 50 does not overlap the light guiding plate 51 in plan view. Therefore, even if a heater is disposed at the base 70, the light source part 52 (specifically, the LEDs of the light source part 52) is unlikely to be affected by the heat generated by the heater.

Further, in the configuration of the prober 1 according to the present embodiment, the irradiation intensity of light on the imaging devices D can be roughly adjusted by the power supplied to the light source part 52 (specifically, the current supplied to the LEDs of the light source part 52) and finely adjusted by the light transmittance of the liquid crystal panel 60. Therefore, in accordance with the present embodiment, the irradiation intensity of light on the imaging devices D can be adjusted in a wide range (e.g., 0.01 lx to 10,000 lx) and with high resolution (e.g., 0.1%).

Further, when the light irradiation intensity for the imaging devices D is adjusted only by the current supplied to the LEDs of the light source part 52, it is difficult to obtain the in-plane uniformity of the in-plane distribution of the illuminance of the light from the placing surface 40*a*. In order to adjust the light irradiation intensity over a wide range and with high resolution, a large number of power sources are required. On the other hand, in the method of using the light transmittance of the liquid crystal panel 60 according to the present embodiment, in order to adjust the light irradiation intensity for the imaging devices D over a wide range and with high resolution, a large number of power sources are not required, which is advantageous in terms of cost.

Another Example of Inspection Process

Next, another example of the inspection process for the wafer W using the prober 1 will be described. Further, the description of like parts as those in the above-described Example 1 of the inspection process will be omitted. Further, in the following description, one imaging device D is inspected in one inspection process. However, a plurality of imaging devices D may be collectively inspected in one inspection process using the prober 1. Further, the following inspection processes are performed under the control of the controller 13.

For example, similarly to Example 1 of the inspection process, the wafer W is placed on the placing surface 40*a* of the stage 10 and, then, the probes 11*a* are brought into contact with the electrodes E of the imaging devices D to be inspected.

Then, similarly to Example 1 of the inspection process, the irradiation part 50 irradiates light under predetermined conditions. Accordingly, light is emitted in a planar shape from the facing surface 51*a* of the light guiding plate 51 that faces the wafer W. However, unlike Example 1 of the inspection process, the light transmittance of the liquid crystal panel 60 is adjusted such that only a specific element region among the plurality of element regions in the liquid crystal panel 60 transmits light. Specifically, only the element region in the liquid crystal panel 60 that corresponds to the imaging device D to be inspected is adjusted to the light transmittance determined by the illuminance distribution acquisition and transmittance determination process, and the light transmittance of the other element regions is set to 0%, that is, the other element regions are set to a light-blocking state. Therefore, among the light emitted in a planar shape from the facing surface 51*a*, only the light incident on the element region of the liquid crystal panel 60 corresponding to the imaging device D to be inspected transmits through the liquid crystal panel 60 and the ceiling plate 40. Therefore, light can be irradiated onto the wafer W only from the region of the placing surface 40*a* corresponding to the imaging device D to be inspected. In other words, light can be locally irradiated only onto the imaging device D to be inspected on the wafer W.

When the light is irradiated, an inspection signal is inputted to the probes 11*a*. Accordingly, the imaging devices D are inspected.

By using the prober 1 as described above, the light can be irradiated locally only on the imaging devices D to be inspected on the wafer W.

Another Example of Liquid Crystal Panel

Figure 8:
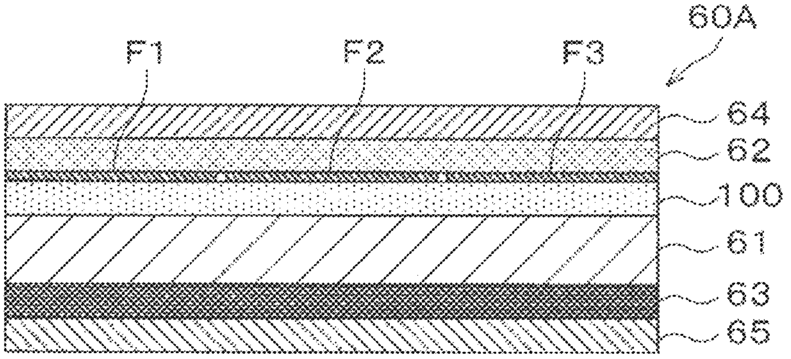
FIG. 8 is a partially enlarged cross-sectional view of another example of the liquid crystal panel.

FIG. 8 is a partially enlarged cross-sectional view of another example of the liquid crystal panel.

Unlike the liquid crystal panel 60 shown in FIG. 7, a liquid crystal panel 60A shown in FIG. 8 has a filter substrate (an example of a filter member) 100 in which the plurality of filters F1, F2, and F3 that transmit different wavelengths are formed to correspond to the element regions between the glass substrate 62 and the liquid crystal layer 61. For example, the filter F1 transmits only a red (R) wavelength, the filter F2 transmits only a green (G) wavelength, and the filter F3 transmits only a blue (B) wavelength.

By using the liquid crystal panel 60A, it is possible to irradiate the imaging devices D with light having any one of a plurality of different wavelengths from a single light source, without using a plurality of light sources that emit light of different wavelengths.

(Modification)

Figure 9:
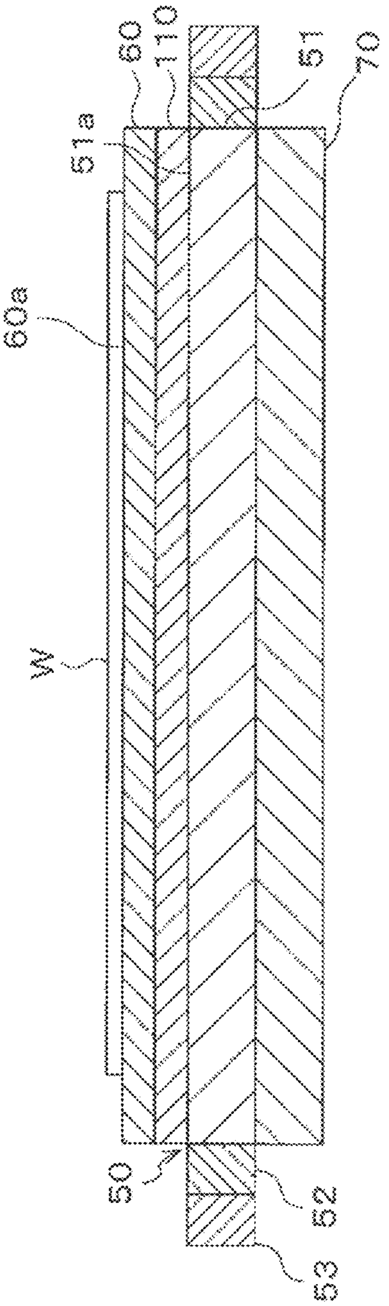
FIG. 9 shows another example of a position of the liquid crystal panel in the stage.

FIG. 9 shows another example of the position of the liquid crystal panel 60 in the stage.

In the above example, the liquid crystal panel 60 is disposed below the ceiling plate 40 that functions as a diffusion plate. Alternatively, as shown in FIG. 9, the liquid crystal panel 60 may be disposed above a diffusion plate 110 in the stage 10A. In this case, for example, the upper surface 60*a* of the liquid crystal panel 60 serves as the placing surface on which the wafer W is placed.

However, when the liquid crystal panel 60 is disposed below the ceiling plate 40 that functions as a diffusion plate, the influence of the gap between the element regions of the liquid crystal panel 60 on the light irradiated to the imaging devices D and the inspection result can be reduced.

Further, the diffusion plate may be omitted from the stage.

It should be noted that the above-described embodiments are illustrative in all respects and are not restrictive. The above-described embodiments may be omitted, replaced, or changed in various forms without departing from the scope of the appended claims and the gist thereof. For example, the components of the above-described embodiments can be randomly combined.

The effects described in the present specification are merely explanatory or exemplary, and are not restrictive. In other words, in the technique related to the present disclosure, other effects apparent to those skilled in the art can be obtained from the description of the present specification in addition to the above-described effects or instead of the above-described effects.

The following configurations are also included in the technical scope of the present disclosure.

(1) An inspection apparatus for inspecting an inspection target device, wherein the inspection target device is a backside-illumination imaging device, on which light is incident from a back surface opposite to a side where a wiring layer is provided, and is formed on an inspection target object, the inspection apparatus comprising:

a placing table configured to support the inspection target object while facing the back surface of the imaging device, wherein the placing table includes:

a transparent placing surface on which the inspection target object is placed; and an irradiation part disposed below the placing surface and configured to irradiate light toward the inspection target object placed on the placing surface, wherein the irradiation part includes:

a light guiding plate having a facing surface facing the inspection target object with the placing surface interposed therebetween; and a light source part disposed in a region laterally outside from the light guiding plate and configured to emit light toward a lateral edge surface of the light guiding plate, wherein the light guiding plate emits light, which is emitted from the light source part and incident on the lateral edge surface of the light guiding plate, from the facing surface toward the placing surface, the placing table further includes an optical member that transmits light directed from the facing surface of the light guiding plate toward the inspection target object placed on the placing surface, and the optical member is divided into a plurality of regions, with light transmittance configured to be variable for each region.

(2) The inspection apparatus of (1), wherein the optical member is a liquid crystal panel.

(3) The inspection apparatus of (2), wherein the liquid crystal panel has a plurality of filters, each transmitting a different wavelength, and each of the plurality of filters corresponds to each of the regions.

(4) The inspection apparatus of any one of (1) to (3), further comprising a controller, wherein the controller is configured to obtain in-plane distribution of an illuminance of the light from the placing surface, and adjust a light transmittance of the optical member based on the obtained result.

(5) The inspection apparatus of any one of (1) to (4), further comprising a controller, wherein the controller is configured to adjust a light transmittance of the optical member such that only a specific region among the plurality of regions transmits light.

(6) An inspection method for inspecting an inspection target device, wherein the inspection target device is a backside-illumination imaging device on which light is incident from a back surface opposite to a side where a wiring layer is provided, and is formed on an inspection target object, the inspection method comprising:

placing the inspection target object on a transparent placing surface such that the back surface of the imaging device faces the placing surface, causing light to be emitted toward a lateral edge surface of a light guiding plate, causing the light to be emitted from a facing surface of the light guiding plate that faces the inspection target object, causing the light to transmit through an optical member divided into a plurality of regions with variable light transmittance, and causing the light to be emitted from the placing surface;

obtaining in-plane distribution of an illuminance of the light from the placing surface; and adjusting a light transmittance of the optical member based on the obtained result.

The invention claimed is:

1. An inspection apparatus for inspecting an inspection target device, wherein the inspection target device is a backside-illumination imaging device, on which light is incident from a back surface opposite to a side where a wiring layer is provided, and is formed on an inspection target object, the inspection apparatus comprising:

a placing table configured to support the inspection target object while facing the back surface of the imaging device, wherein the placing table includes:

a transparent placing surface on which the inspection target object is placed; and an irradiation part disposed below the placing surface and configured to irradiate light toward the inspection target object placed on the placing surface, wherein the irradiation part includes:

a light guiding plate having a facing surface facing the inspection target object with the placing surface interposed therebetween; and a light source part disposed in a region laterally outside from the light guiding plate and configured to emit light toward a lateral edge surface of the light guiding plate, wherein the light guiding plate emits light, which is emitted from the light source part and incident on the lateral edge surface of the light guiding plate, from the facing surface toward the placing surface, the placing table further includes an optical member that transmits light directed from the facing surface of the light guiding plate toward the inspection target object placed on the placing surface, and the optical member is divided into a plurality of regions, with light transmittance configured to be variable for each region.

2. The inspection apparatus of claim 1, wherein the optical member is a liquid crystal panel.

3. The inspection apparatus of claim 2, wherein the liquid crystal panel has a plurality of filters transmitting different wavelengths and formed to correspond to the regions.

4. The inspection apparatus of claim 3, further comprising a controller, wherein the controller is configured to obtain in-plane distribution of an illuminance of the light from the placing surface, and adjust a light transmittance of the optical member based on the obtained result.

5. The inspection apparatus of claim 3, further comprising a controller, wherein the controller is configured to adjust a light transmittance of the optical member such that only a specific region among the plurality of regions transmits light.

6. The inspection apparatus of claim 2, further comprising a controller, wherein the controller is configured to obtain in-plane distribution of an illuminance of the light from the placing surface, and adjust a light transmittance of the optical member based on the obtained result.

7. The inspection apparatus of claim 2, further comprising a controller, wherein the controller is configured to adjust a light transmittance of the optical member such that only a specific region among the plurality of regions transmits light.

8. The inspection apparatus of claim 1, further comprising a controller, wherein the controller is configured to obtain in-plane distribution of an illuminance of the light from the placing surface, and adjust a light transmittance of the optical member based on the obtained result.

9. The inspection apparatus of claim 1, further comprising a controller, wherein the controller is configured to adjust a light transmittance of the optical member such that only a specific region among the plurality of regions transmits light.

10. An inspection method for inspecting an inspection target device, wherein the inspection target device is a backside-illumination imaging device on which light is incident from a back surface opposite to a side where a wiring layer is provided, and is formed on an inspection target object, the inspection method comprising:

placing the inspection target object on a transparent placing surface such that the back surface of the imaging device faces the placing surface, causing light to be emitted toward a lateral edge surface of a light guiding plate, causing the light to be emitted from a facing surface of the light guiding plate that faces the inspection target object, causing the light to transmit through an optical member divided into a plurality of regions with variable light transmittance, and causing the light to be emitted from the placing surface;

obtaining in-plane distribution of an illuminance of the light from the placing surface; and adjusting a light transmittance of the optical member based on the obtained result.

* * * * *